United States Patent [19]

Bergh

[11] Patent Number: 5,244,226
[45] Date of Patent: Sep. 14, 1993

[54] TRAILER AND STEERABLE WHEELS THEREFOR

[76] Inventor: C. John Bergh, 117 Bartholomew Rd., Berwyn, Pa. 19312

[21] Appl. No.: 763,608

[22] Filed: Sep. 23, 1991

[51] Int. Cl.$^5$ .............. B62D 13/00; B62D 5/06
[52] U.S. Cl. ............................... 280/442; 280/426; 180/142
[58] Field of Search ............ 280/426, 442, 443, 444, 280/445, 432; 180/132, 141, 142

[56] References Cited

U.S. PATENT DOCUMENTS

| | | | |
|---|---|---|---|
| 1,955,178 | 4/1934 | Elwood | 280/443 |
| 2,092,683 | 9/1937 | Stidham | 280/443 |
| 2,152,511 | 3/1939 | Vanderwerf | 280/443 |
| 2,174,493 | 9/1939 | Vanderwerf | 280/443 |
| 2,258,678 | 10/1941 | Elwood | 280/443 |
| 2,312,646 | 3/1943 | Hunt | 280/443 |
| 2,533,553 | 12/1950 | Burns | 280/443 |
| 3,291,503 | 12/1966 | De Lay | 280/443 X |
| 4,208,063 | 6/1980 | Baker et al. | 280/445 |
| 4,455,035 | 6/1984 | Ivony et al. | 280/432 |
| 4,482,165 | 11/1984 | Dawson et al. | 280/432 |
| 4,768,802 | 9/1988 | Winkler | 280/426 X |
| 4,824,135 | 4/1989 | McGregor | 280/443 X |

FOREIGN PATENT DOCUMENTS

| | | | |
|---|---|---|---|
| 0161472 | 11/1985 | European Pat. Off. | 280/442 |
| 0282426 | 9/1988 | European Pat. Off. | 280/426 |
| 1363252 | 4/1963 | France | 280/426 |
| 0029471 | 2/1987 | Japan | 280/426 |
| 0821276 | 4/1981 | U.S.S.R. | 280/426 |

Primary Examiner—Margaret A. Focarino
Assistant Examiner—Florian Zeender
Attorney, Agent, or Firm—Wegner, Cantor, Mueller & Player

[57] ABSTRACT

A two wheeled trailer is provided with steerable wheels which are hydraulically actuatable according to the articulation angle between the trailer and a towing vehicle and to the forward and reverse mode of travel of these vehicles. In one embodiment, the angle to which the wheels are steered in response to the detected articulation angle may be less for forward travel than for reverse. Also, the wheels may be caused to assume a substantially straight ahead, non-steering configuration at forward speeds above a particular set point, with the steering automatically resumable upon lowering of the speed below another set point. Still another embodiment provides for steering of the wheels, whenever there is a transition between forward and reverse and an articulation angle exists, in a manner that prevents "crabbing" of the trailer relative to the towing vehicle.

21 Claims, 7 Drawing Sheets

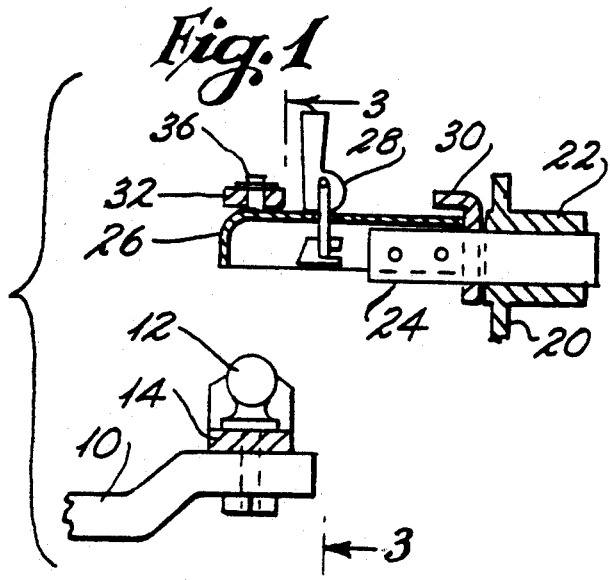
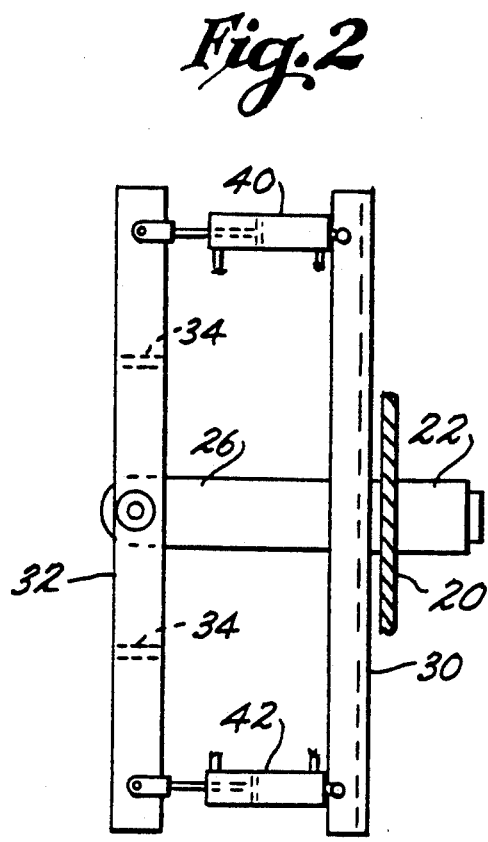
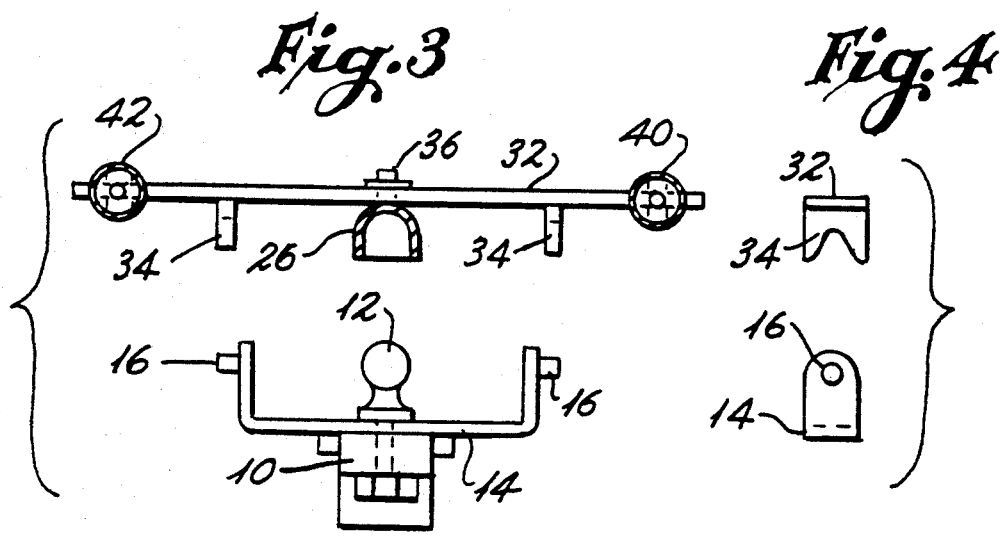

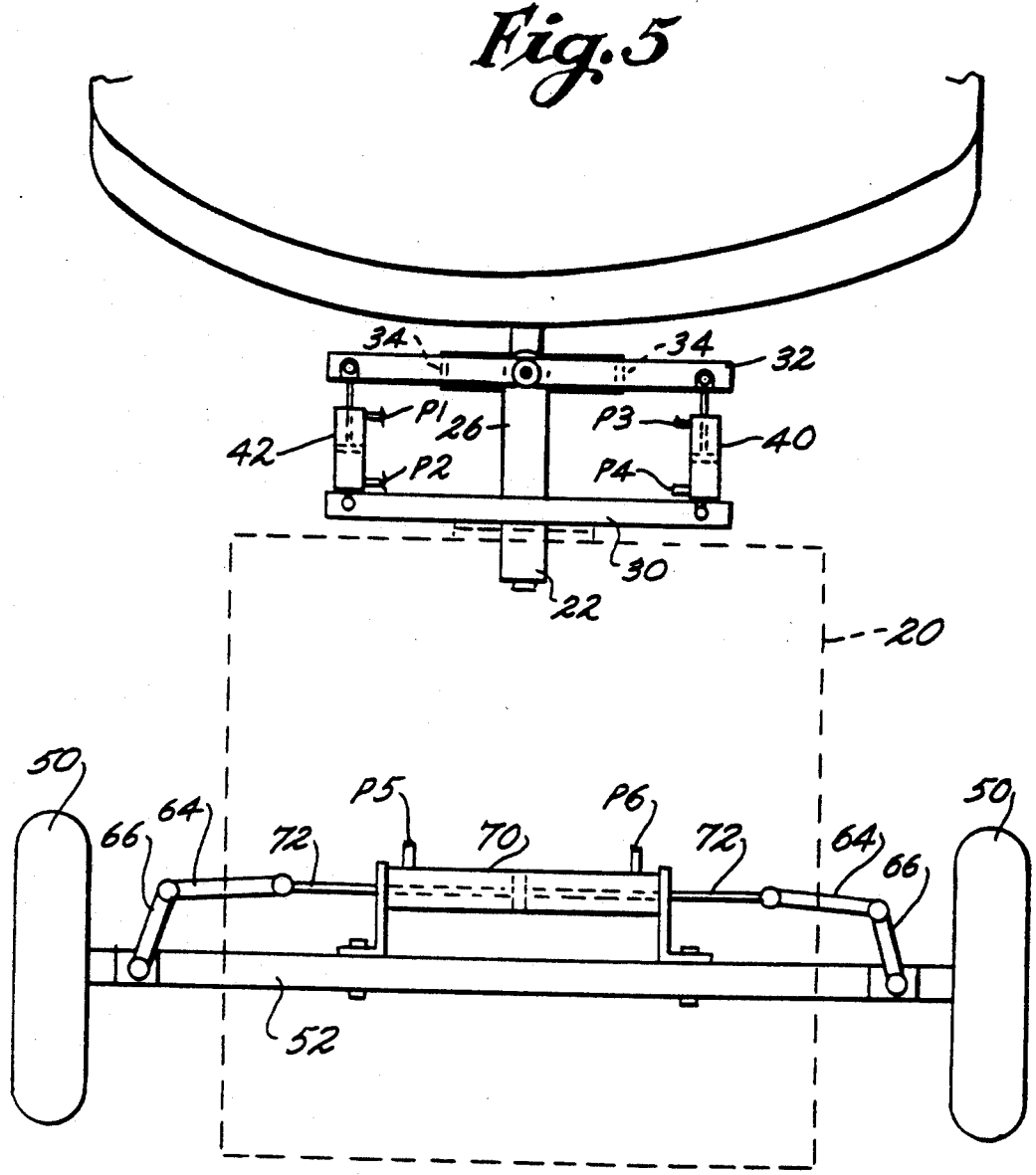
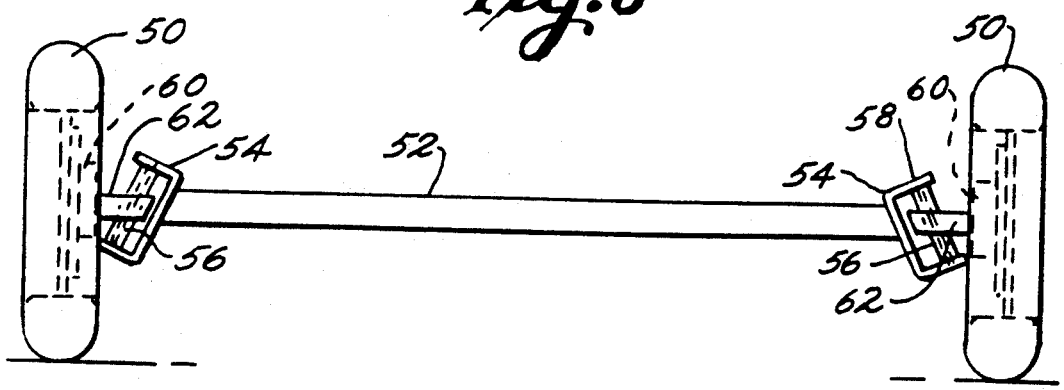

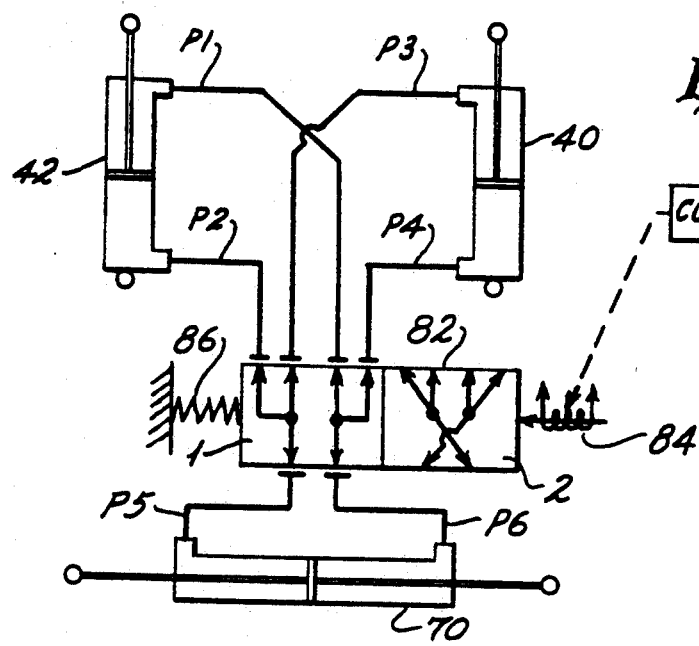
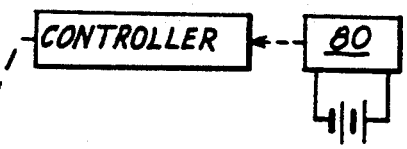
Fig. 7a
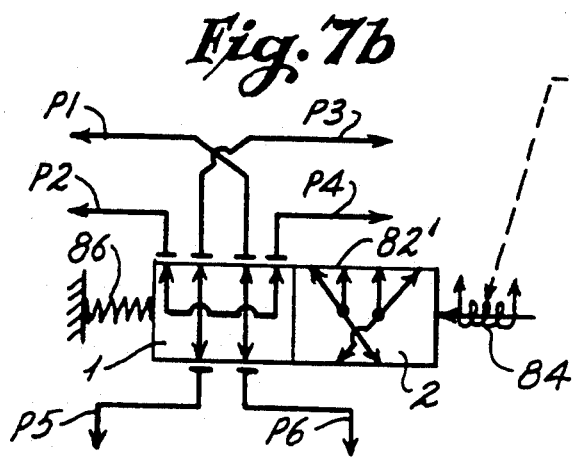
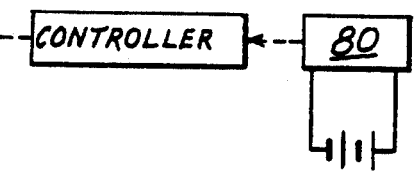
Fig. 7b
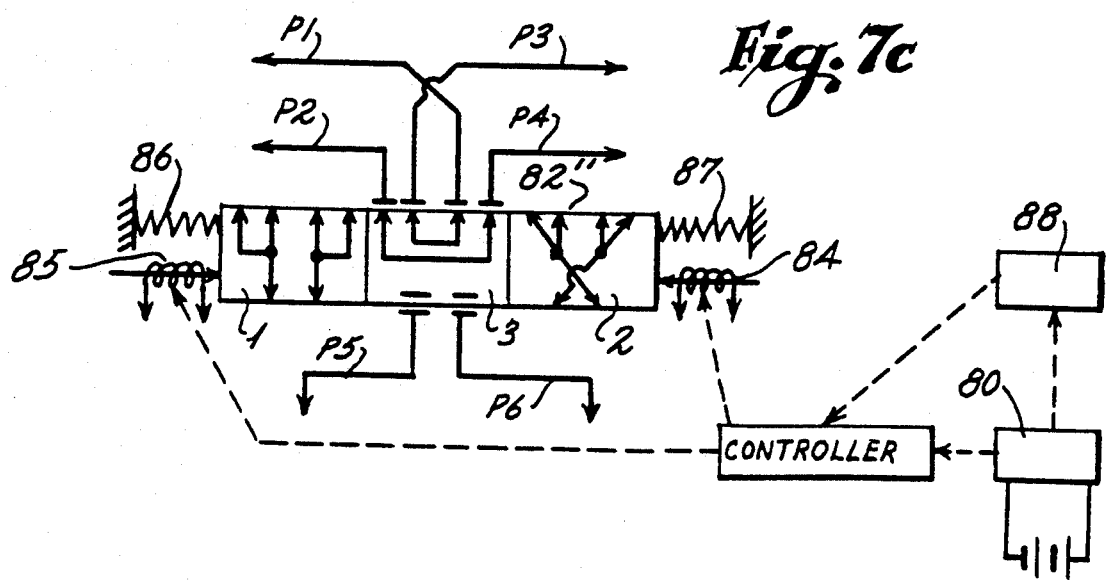
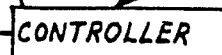
Fig. 7c

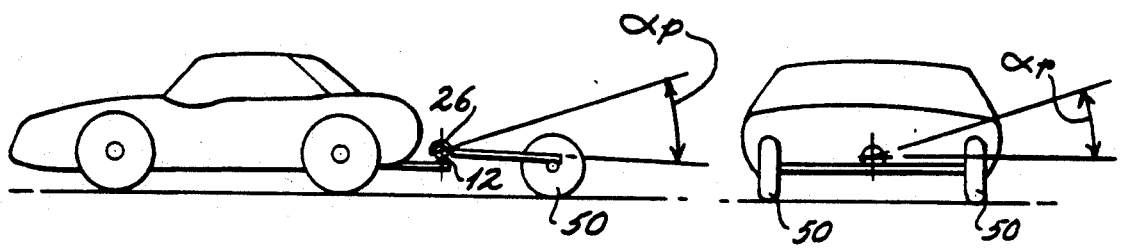
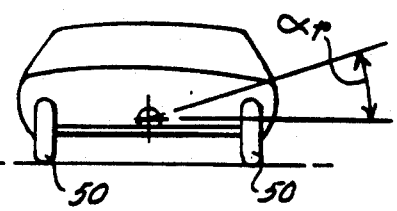
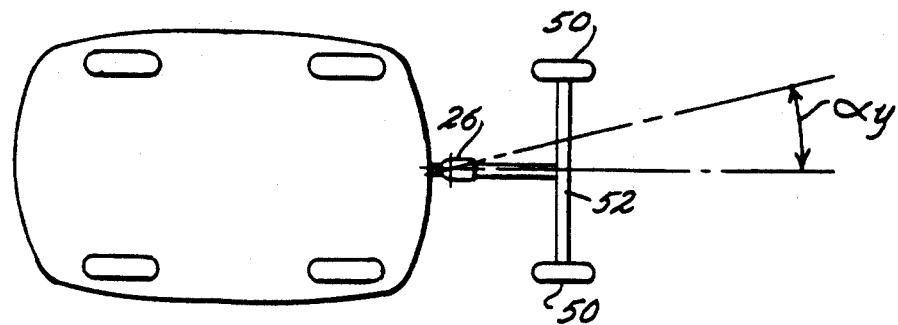
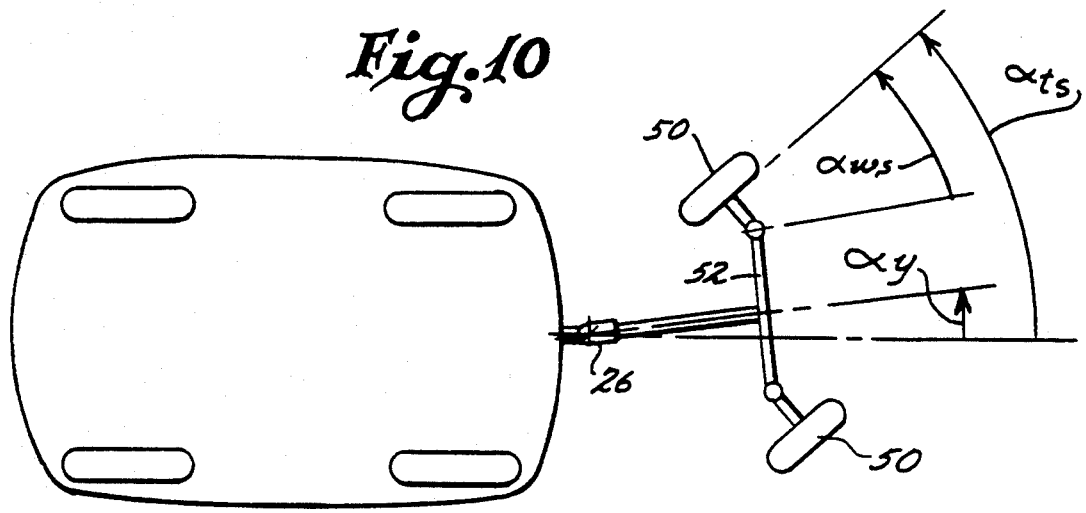

TRAILER AND STEERABLE WHEELS THEREFOR

PRIOR ART CROSS REFERENCES

U.S. Pat. No. 1,955,178, entitled TRAILER, issued Apr. 17, 1934 to C. K. Elwood.

U.S Pat. No. 2,092,683, entitled TRAILER GUIDE, issued Sep. 7, 1937 to A. D. Stidham.

U.S. Pat. No. 2,152,511, entitled HYDRAULIC STEERING MECHANISM FOR ROAD TRAILERS, issued Mar. 28, 1939 to L. H. Vanderwerf.

U.S. Pat. No. 2,174,493, entitled AUTOMOTIVE VEHICLE, issued Sep. 26, 1939, to L. H. Vanderwerf.

U.S. Patent 2,258,678, entitled TRAILER HITCH AND STEERING DEVICE, issued Oct. 14, 1941 to C. K. Elwood.

U.S. Pat. No. 2,312,646, entitled STEERING TRAILER, issued Mar. 2, 1943 to C. C. Hunt.

U.S Pat. No. 3,291,503, entitled AUTOMATICALLY STEERABLE TRAILER, issued Dec. 13, 1966 to M. S. De Lay.

U.S. Pat. No. 4,208,063, entitled TRAILER STEERABLE WHEN IN REVERSE, issued Jun. 17, 1980 to E. S. Baker, et al.

BACKGROUND AND SUMMARY OF THE INVENTION

The invention is in the field of articulated, wheeled vehicles, particularly two-wheeled trailers and a towing package therefor by which the trailer is steerable in both the forward and reverse modes of travel. More particularly, the present invention relates to a single axle trailer and a novel hydraulic steering package having means to detect and respond to conditions of operation of the trailer such as direction of travel, articulation angle, wheel steering angle, speed of travel, and their interrelationships.

It is an object of the invention to convert the motion of articulation of the trailer relative to a towing vehicle into steering for the trailer wheels by means of controls which enable automatic steering in reverse and forward so as to attain ideal relationships of wheel steering angle to articulation angle upon changing directions of travel.

Additionally, it is an object of the invention to provide a steering package which senses the speed of forward travel and, above a specifiable speed, locks the wheels of the trailer in a straight ahead, nonsteering condition while still allowing articulation about the hitch ball. This provides the advantage of increasing the stability of the trailer at high speeds, which may be required for some load/trailer geometry combinations. It is a further object of the invention to provide for automatic resumption of the steering of the wheels upon sensing a reduction of the speed below another specifiable speed.

Also, it is an object of one embodiment of the invention to provide a steering package for the trailer which detects any articulation angle upon transition of the travel mode from forward-to-reverse or reverse-to-forward and further compensates the steering so as to avoid "crabbing" of the trailer relative to the towing vehicle.

Still further, it is an object of the invention to constantly monitor and compare the articulation and wheel steering angles as percentages of their respective ranges of angulation in order to detect any leaks in a hydraulic circuit which interconnects means for detecting the articulation and adjusting the steering in response to such detection.

It is another object of this invention to provide such a steering package which is adapted to the SAE standard ball hitch, so that the trailer is easily mountable and dismountable from the tow hitch in the typical manner.

Simply stated, it is an object of this invention to remove the major impediment to casual use of small trailers, namely, the difficulty of maneuvering them when backing-up.

BRIEF SUMMARY OF THE INVENTION

A two wheeled trailer is provided with steerable wheels which are hydraulically actuatable according to the articulation angle between the trailer and a towing vehicle and to the forward and reverse mode of travel of these vehicles. In one embodiment, the angle to which the wheels are steered in response to the detected articulation angle may be less for forward travel than for reverse. Also, the wheels may be caused to assume a straight ahead, nonsteering configuration at forward speeds above a particular set point, with the steering automatically resumable upon lowering of the speed below another set point. Still another embodiment provides for steering of the wheels, whenever there is a transition between forward and reverse and an articulation angle exists, in a manner that prevents "crabbing" of the trailer relative to the towing vehicle.

The invention resides in the details of construction and operation as more fully hereinafter described and claimed and will become more apparent therefrom, reference being had to the accompanying drawings forming a part hereof, wherein like numerals refer to like parts throughout.

BRIEF DESCRIPTION OF THE DRAWINGS

FIG. 1 is a side elevation, partially in section, illustrating the means of connection between the towed and towing vehicles.

FIG. 2 is a top plan view of the device of FIG. 1.

FIG. 3 is cross-section as generally viewed in the direction of the arrows 3—3 of FIG. 1.

FIG. 4 is a right side elevation of the device of FIG. 3.

FIG. 5 is a top view, partially in phantom, illustrating the pump and steering cylinders of the invention, and their interconnections to mechanical parts of the trailer.

FIG. 6 is a bottom plan view of FIG. 5.

FIGS. 7a–7c are schematic views illustrating the hydraulic circuit and several different embodiments of flow control valves and associated controls therefor for steering the wheels of the trailer in response to various detected conditions of travel.

FIGS. 9a–9c respectively illustrate the angles of pitch, roll, and yaw of the trailer relative to the towing vehicle.

FIG. 10 illustrates the relationships between the "yaw", "wheel steering", and "total steering" angles which are used in describing the invention.

FIG. 14b is a cross-section as viewed generally in the direction of the arrows 14b—14b in FIG. 14a.

DETAILED DESCRIPTION OF THE INVENTION

Figure 8:
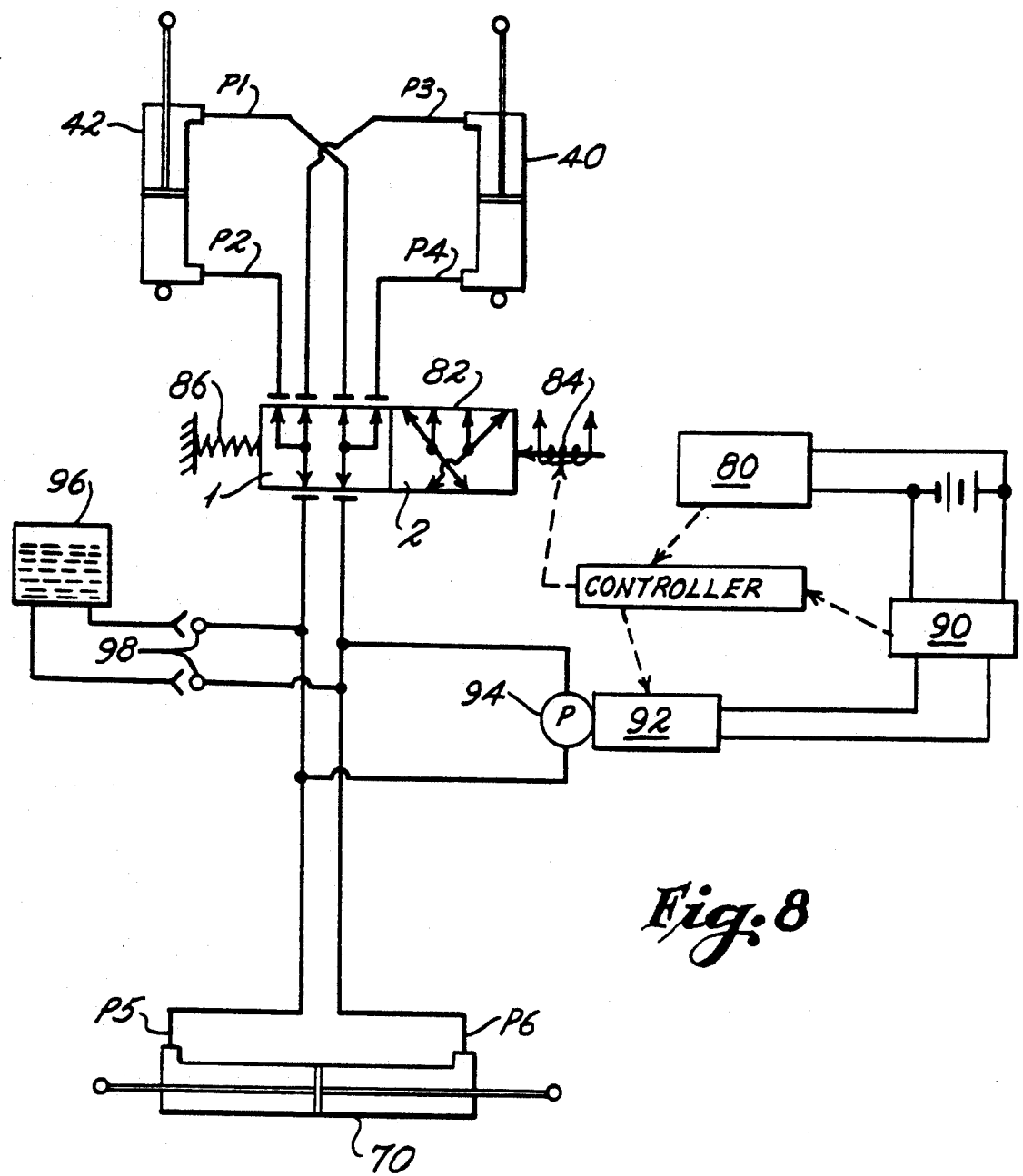
FIG. 8 is a schematic view, similar to that of FIG. 7a, illustrating an embodiment of the invention which avoids crabbing of the trailer relative to the towing vehicle after the transition between forward and reverse travel of the vehicles.

Movement about the standard tow hitch ball of the typical trailer having two non-steerable wheels may be described by reference to FIGS. 9a-9c, from which it may be seen that:

$a_p$ = pitch angle
$a_r$ = roll angle
$a_y$ = yaw angle

The yaw (articulation) angle of the trailer relative to the longitudinal axis of the towing vehicle is used throughout the following disclosure in describing the invention.

Further, for trailers with steerable wheels, reference is made to FIG. 10 from which it may be seen that $a_{ws}$ is defined herein as the angle of "wheel steering" relative to the tow bar of the trailer, and $a_{ts}$ is defined as the angle of "total steering" of the wheels relative to the longitudinal axis of the towing vehicle. These angles will also be referred to throughout the following disclosure in describing the invention.

Referring to FIGS. 1-4, the draw bar 10 of the towing vehicle has the typical hitch ball 12 affixed to it. Also affixed to draw bar 10 is a yoke 14 having pins 16 protruding transversely along a "pitch" axis extending through the center of the hitch ball 12.

The body 20 of the trailer (shown in phantom in FIG. 5) has a bushing 22 affixed thereto so as to receive a tow bar 24 rotatably within bushing 22. Thus, the trailer body 20 is free to rotate relative to tow bar 24 about a "roll" axis coaxial with bushing 22.

Tow bar 24 has a socket 26 and latch 28 for coupling the trailer to the ball 12 of the towing vehicle. A bar 30 is affixed to tow bar 24 near the bushing 22, and a bar 32 is pivotally mounted on a pin 36 which protrudes from the top of socket 26, with both of the bars 30 and 32 extending generally laterally of the tow bar 24. Additionally, pivotal bar 32 is provided with downwardly protruding yokes 34 which are engagable over pins 16 of the yoke 14 when the ball 12 and socket 26 are mated.

As seen in FIG. 2, cylinders 40 and 42 are pivotally supported on opposite ends of bar 30, and the piston rods of cylinders 40,42 each are connected pivotally to a corresponding end of the pivotal bar 32. Thus, the pivotal bar 32 remains substantially parallel to the rear bumper of the towing vehicle at all times and bar 30 moves with the tow bar 24 so that cylinders 40,42 expand and contract respectively according to articulation between the trailer and towing vehicle about a "yaw" axis which is coaxial with the pin 36.

Referring to FIGS. 5 and 6, wheels 50 of the trailer are mounted on hubs 60 which, in turn, are mounted upon bearings for rotation about spindles 62. Spindles 62 are mounted on steering knuckles 56 which are supported on yokes 54 by king pins 58 so that steering knuckles 56 are free to pivot in a generally horizontal plane. An axle 52 has a yoke 54 attached to each end thereof and also supports a steering cylinder 70 generally midway of its length. The piston of cylinder 70 has a rod 72 protruding from each end of the cylinder, with each end of rod 72 connected to one end of a corresponding ball-jointed tie rod 64 which is connected at the other end thereof to a steering arm 66. Thus, the wheels 50 of the trailer are steerable by displacement of the rod 72 upon actuation of the cylinder 70. Cylinder 70 is actuatable via a hydraulic circuit in response to the expansion and contraction of cylinders 40 and 42 and according to the status of a flow control valve. The cylinders 40 and 42 thus act as pumps for the hydraulic circuit.

Figure 11:
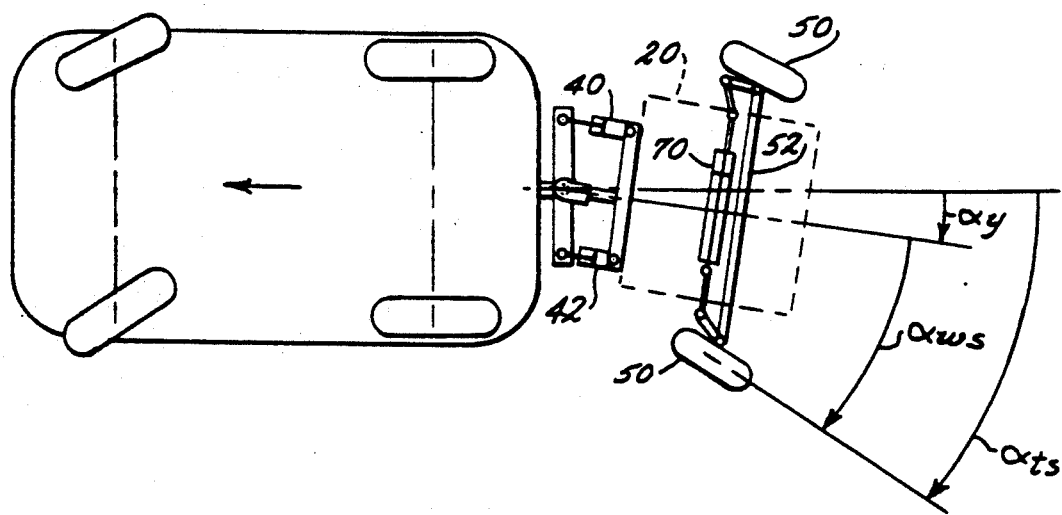
FIGS. 11 and 12 are schematic illustrations of the conditions of the hydraulic cylinders in the inventive device during the negotiation of left turns from straight line travel during forward and reverse modes of travel, respectively.

FIG. 11 is a top plan schematic illustrating a towing vehicle and trailer making a left turn from a straight path of travel while going forward. Under this condition, pump cylinder 42 is contracted, pump cylinder 40 is extended, and steering cylinder 70 is displaced so that the wheels of the trailer are pointed to the right. In the forward mode of travel, $$a_{ts} = a_y + a_{ws}. \tag{1}$$

Figure 12:
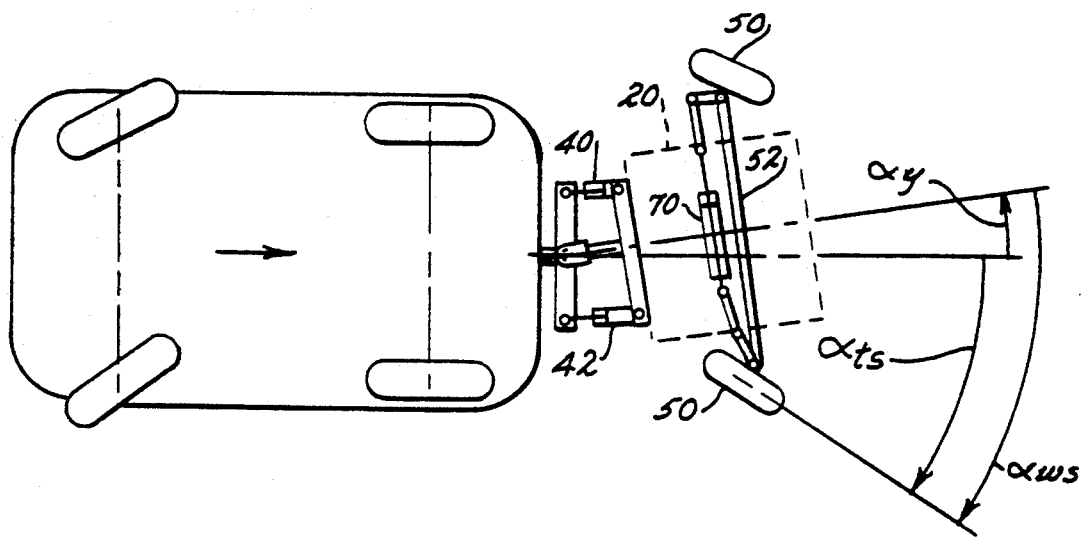
Figure 15:
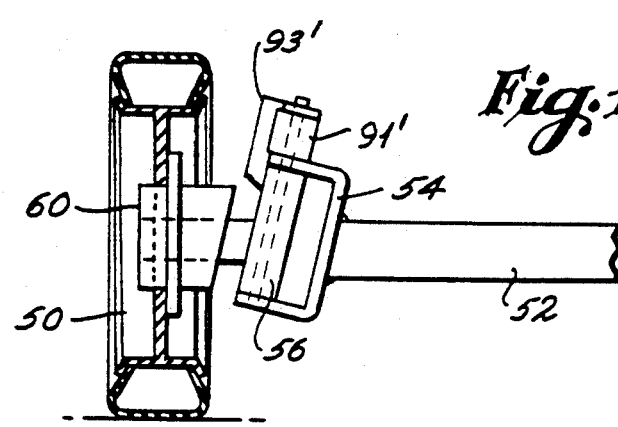
FIG. 15 is a partial view similar to that of FIG. 6 and illustrating one form of sensor for the wheel steering angle.

In FIG. 12, the towing vehicle and trailer are making a left turn from a straight path of rearward travel. Under this condition, the pump cylinders 40 and 42 are just the opposite from their situations in FIG. 11, but the wheels of the trailer are still oriented similarly to the situation of FIG. 11. While steering the towing vehicle into a turn during reverse travel, the trailer wheels must be steered counter to the direction that the trailer body is turning or articulating because the trailer will tend to yaw about the hitch ball in a direction opposite to the desired direction of travel. As indicated in FIG. 12, the sense of $a_y$ is opposite the senses of $a_{ws}$ and $a_{ts}$ so that the total steering angle is less than the wheel steering angle.

Therefore, in order to achieve a meaningful steering angle for the wheels, $a_{ws}$ should be a sufficiently large multiple of, say four times, $a_y$.

Examination of FIGS. 11 and 12 reveals that porting of the hydraulic fluid from pump cylinders 40 and 42 to steering cylinder 70 must be reversed with each change between the forward and reverse modes of operation of the trailer, and FIGS. 7a-7c schematically illustrate several arrangements by which these hydraulic paths may be varied automatically according to various conditions of travel of the trailer.

In the embodiment of FIG. 7a, direction sensor 80 senses reverse motion of the trailer and outputs an appropriate signal to a controller which, in turn, causes a solenoid 84 to energize so as to shift valve 82, against the bias of spring 86, to the "reverse steering" position 2. Forward travel of the trailer is sensed, either directly or indirectly, by sensor 80 in response to which solenoid 84 is deenergized so that flow control valve 82 is returned to its rest (forward steering) position by spring 86. For either position of valve 82, the combined total volume of hydraulic fluid which is displaced from pump cylinders 40 and 42, during yawing of the trailer in either direction relative to the towing vehicle, is applied to one end of steering cylinder 70 so that the ratio of $a_{ws}/a_y$ (e.g., 4/1) remains the same for steering the wheels 50 for travel in forward and reverse directions.

By referring to FIGS. 7a and 11, it may be seen that a towing vehicle, when turning left from forward straight travel, causes pump cylinder 40 to expand and pump cylinder 42 to contract. In this case, flow control valve 82 is in the position illustrated in FIG. 7a and hydraulic fluid from ports P2 and P3 is routed to port P5 of steering cylinder 70, resulting in the wheels 50 being steered as shown in FIG. 11.

In the case of the towing vehicle being put in a reverse left turn from straight ahead travel, the trailer tends to pivot at the hitch ball in the direction illustrated in FIG. 12 so that cylinder 40 is contracted and cylinder 42 is expanded. Thus, in order to steer the trailer wheels properly for a left reverse turn, the reverse motion is detected by direction sensor 80 and solenoid 84 shifts valve 82 to position 2 of FIG. 7a, resulting in the fluid from ports P1 and P4 being routed to port P5 of steering cylinder 70 so that the illustrated angulation of the wheels 50 is achieved.

With the hydraulic interconnection scheme of FIG. 7a, it also is contemplated that a single, double acting, double ended cylinder, if properly connected, could be used in place of the pump cylinders.

In the embodiment of FIG. 7b, the ratio $\alpha_{ws}/\alpha_y$ is less in the forward mode than in the reverse mode. This is achieved by position 1 of valve 82' connecting cylinder ports P2 and P4 together and applying the volume displaced through ports P1 and P3 respectively to ports P6 and P5, so that only a fraction (e.g., one-half) of the volume displaced by the pump cylinders 40 and 42 is applied to the steering cylinder in the forward mode. However, the full amount of the volume displaced by pump cylinders 40 and 42 is utilized for steering when valve 82' is in the reverse mode of position 2. Thus valve 82' provides for the steering ratio applied to wheels 50 to be distinctly different for forward and reverse travel of the trailer.

In the embodiment of FIG. 7c, the hydraulic routing for positions 1 and 2 of valve 82" is the same as for positions 1 and 2 of valve 82 of FIG. 7a. This embodiment also provides the flow control valve with a position 3 and a speed sensor 88 which, in forward travel, ensures that wheels 50 are held in a substantially straight away condition at a set speed and are not again steerable until deceleration to another set speed. These additional features also are applicable to the embodiment of FIG. 7b.

In this third position of the valve 82" the ports P5 and P6 of steering cylinder 70 are closed so that the wheels 50 of the trailer are not steerable; and the hydraulic lines of the pump cylinders 40 and 42 are interconnected so that they don't interfere with articulation between the trailer and towing vehicle. Thus, above some particular forward speed as sensed by device 88, valve 82" is activated to position 3 so that the wheels 50 act like the non-steerable wheels of conventional trailers.

Position 3 of valve 82" is also the "failsafe" condition of the flow control valve upon loss of power, since springs 86 and 87 bias valve 82" to position 3 upon deenergization of both of the solenoids 84 and 85.

In operation of this embodiment at low speeds, forward travel of the trailer is sensed by detector 80 to cause solenoid 85 to energize and move the valve 82" to position 1. As the speed increases above some set value, say 20 mph, speed sensor 88 will notify the controller for disconnecting or deenergizing solenoid 85 so that springs 86 and 87 return valve 82" to the center position 3 at which the trailer acts as a non-steerable, conventional trailer. Reduction of speed below another set point, say 17 mph, is also detectable by speed sensor 88 so that the controller again will provide energization of solenoid 85 to facilitate steering of the trailer in the forward mode of travel.

In still another embodiment, the hydraulic circuits of any of the preceding embodiments may be altered, as in FIG. 8, by adding a "shift sensor" 90 having angle sensors for sensing $\alpha_{ws}$ and $\alpha_y$ and outputting signals to the controller which are indicative of these angles. Upon the occurrence of each transition of the trailer between forward and reverse, as detected by member 80, the controller will output the appropriate signal for changing the flow control valve 82 and, according to the signals from shift sensor 90, will activate a bidirectional electric motor 92 to drive hydraulic "shift pump" 94. The shift pump 94 shifts fluid in either direction from one side to the other of steering cylinder 70, as directed by the controller, and is run just long enough to establish a steering angle $\alpha_{ws}$ starting point and a specified ratio of $\alpha_{ws}/\alpha_y$ which is sufficient to overcome "crabbing" of the trailer. Having achieved the appropriate steering angle starting point, the steering cylinder is actuated by pump cylinders 40 and 42, according to the articulation between the two vehicles, as described earlier with reference to FIGS. 7a-7c.

A reservoir 96 and check valves 98 are included for the purpose of automatically replenishing the hydraulic circuit, on the suction side of pump 94 when it is running, to compensate for any loss of fluid from leaks or the like.

For proper steering of a trailer in forward travel, it has been found that a constant relation exists between the articulation (yaw) angle $\alpha_y$ as a fraction or percent of its total range of travel to either side of straight ahead (0 degrees) and the wheel steering angle $\alpha_{ws}$ as a fraction of its total range of travel to either side of straight ahead (0 degrees). Simply stated, for forward travel, the wheel steering angle percentage is always equal in magnitude and direction to the articulation angle percentage.

$$\alpha_{ws}/|\alpha_{ws}\text{ range}| = \alpha_y/|\alpha_y\text{ range}| \tag{2}$$

For proper countersteering of the trailer in reverse travel along the same path, it also has been found that these angle percentages must be equal in magnitude and opposite in direction.

$$\alpha_{ws}/|\alpha_{ws}\text{ range}| = (-)\alpha_y/|\alpha_y\text{ range}| \tag{3}$$

Thus, whenever a different path is to be traveled after a reverse-to-forward or forward-to-reverse transition, then the relation of articulation angle percentage to wheel steering angle percentage is incorrect right after the transition, i.e., the wheel steering angle is opposite in sense or direction to that required and, in order to prevent so-called "crabbing" between the vehicles, the wheels must be turned to meet the relationships of equations (2) and (3). In other words, whenever there is such a transition, and prior to further travel, the wheels should be turned so that the percentages are equal in magnitude and opposite in sense to their conditions just prior to the transition.

EXAMPLE 1

For example, with a trailer having one of the steering packages according to FIGS. 7a-7c and maximum ranges of articulation of 6° to either side of 0° and of wheel steering of 30° to the right or left, the steering ratio=$\alpha_{ws}/\alpha_y$=30°/6°=5/1. Thus, $\alpha_{ws}$=(5)$\alpha_y$.

Figure 13A:
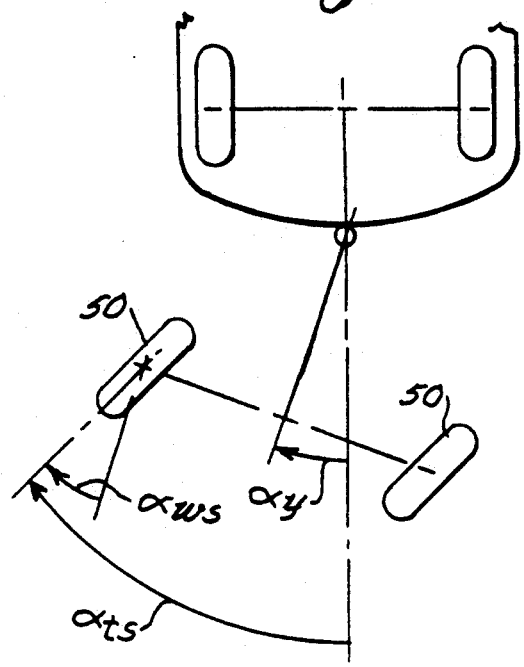
FIGS. 13a-13c are schematic illustrations of how "crabbing" of the trailer relative to the towing vehicle can occur after a transition between forward and reverse and how to overcome such a condition by means of the invention.

Further, upon stopping the trailer during travel in the forward direction while making a left turn, as illustrated in FIG. 13a, equations (1) and (2) apply. Thus, if $\alpha_y$=1.5° and $\alpha_{ws}$=7.5°, then $\alpha_{ts}$=1.5°+7.5°=9.0°.

Upon changing to the reverse mode of travel, and since this trailer does not have the "shift" mechanism of the embodiment of FIG. 8, (a) the articulation percentage or fraction is equal to the wheel steering percentage or fraction, but in the opposite direction, and (b) the sense of the articulation angle is opposite to that of the wheel steering angle so that the total steering angle is less than the wheel steering angle.

The final total steering angle is found by adding the changes in articulation and wheel steering to the initial total steering angle, i.e., $$\alpha_{tsf}=\alpha_{tsi}+\Delta\alpha_y+\Delta\alpha_{ws} \quad (4)$$

The steering ratio is $\Delta\alpha_{ws}/\Delta\alpha_y$ and, for reverse, the wheel steer angle and articulation angles are opposite in sense. Also, for straight rearward travel, $\alpha_{tsf}$=0.

Thus, substituting into equation (4) to find the steering angle for straight reverse travel from this initial condition, 0=9°+$\Delta\alpha_y$−(5)$\Delta\alpha_y$; or $\Delta\alpha_y$=9°/4=2.25°. Thus, $\Delta\alpha_{ws}$=(5)2.25°=11.25°.

Then, the trailer articulation angle increases by 2.25° to 3.75° and the wheel steering angle changes to 7.5°−11.25°=−3.75°, resulting in $\alpha_{ts}$=+3.75°−3.75°=0°.

Figure 13B:
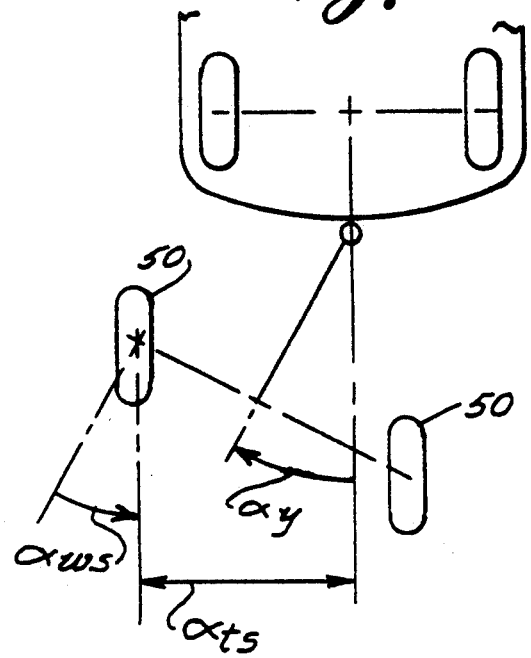

Thus, without benefit of the shift pump, upon straightening the wheels of the towing vehicle of FIG. 13a and putting it in reverse, the trailer and towing vehicle will travel straight backward but with the trailer "crabbed" or displaced sideways relative to the towing vehicle in the manner illustrated in FIG. 13b, with $\alpha_y$=3.75° and $\alpha_{ws}$=−3.75°.

EXAMPLE 2

Figure 13C:
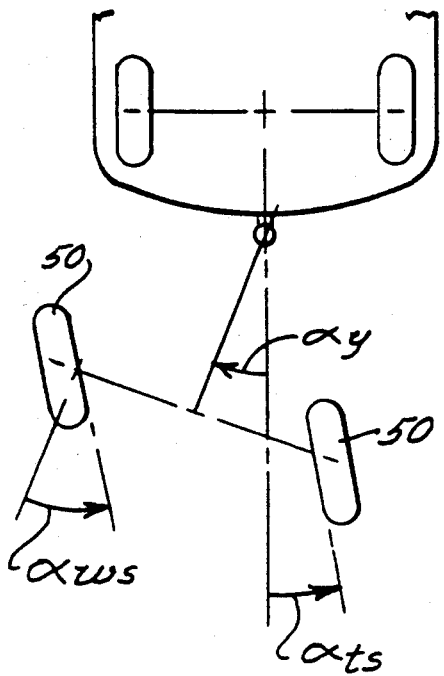

If the same trailer of FIG. 13a is provided with the "shift" mechanism as in the embodiment of FIG. 8, then upon transition from forward to reverse, the shift pump 94 is actuated just long enough to change $\alpha_{ws}$ from +7.5° to −7.5° to orient the trailer wheels as in FIG. 13c.

Then, upon backing the towing vehicle along a straight path, the relations that apply to the embodiments of FIGS. 7a–7c are in effect, and the trailer will align perfectly with the towing vehicle, resulting in $\alpha_{ts}$=$\alpha_{ws}$=$\alpha_y$=0°.

The forward/reverse sensor 80 disclosed in FIGS. 7a–7c and 8 may be as simple as a relay which is energized with or in response to the back-up lights indicating that the towing vehicle has been shifted into reverse gear, with the relay being deenergized when the back-up lights are extinguished and indicate a shift to a forward gear. This sensor could take other forms, such as a member for sensing the rotational direction of the trailer wheels and providing an output which the controller could sense in order to shift the flow control valve 82 to the appropriate position for forward or reverse travel of the trailer.

The speed sensor 88 of FIG. 7c is used in shifting the flow control valve 82″ to a "trailer mode" in which, during forward travel above a designated speed, the wheel steering cylinder 70 is locked with $\alpha_{ws}$=0° and the pump cylinders 40 and 42 are free to expand and contract with articulation of the trailer relative to the towing vehicle. Upon slowing to below another designated speed during forward travel, the steering is again enabled. This "trailer mode" potentially is more stable than the steering mode at high speeds because it is subject to only the fundamental trailer dynamics and does not include the effects of steering factors such as caster, toe-in, camber and steering ratio multiplication on the dynamical behavior of the trailer.

In practice, the speed sensor 88 may be a tachometer device which senses the rotational speed of the trailer wheels and which incorporates a first speed switch which is actuated at a designated speed, say above 20 mph, to tell the controller to switch valve 82″ to the trailer mode position. A second speed switch of the device could be actuated at a designated speed as the trailer slows, say below 17 mph, for releasing valve 82″ from the trailer mode. Thus, a "deadband" is provided so that steering is reengaged at a slightly lower speed to avoid unnecessary switching right around the 20 mph setting. The controller also checks the output of forward/reverse detector 80 in order to limit this mode to forward travel conditions.

Figure 14A:
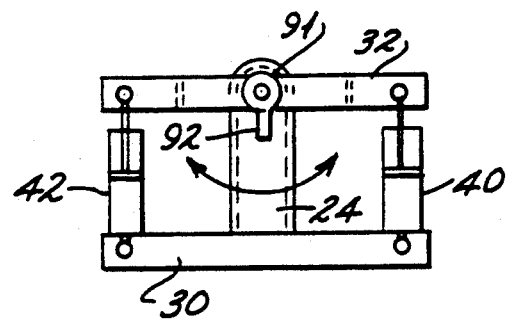
FIG. 14a is a partial top plan view illustrating one form of sensor for the articulation angle.
Figure 14B:
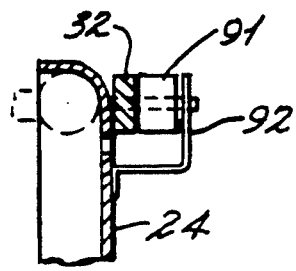

The shift sensor 90 described with reference to FIG. 8 has a sensor for $\alpha_y$ and a sensor for $\alpha_{ws}$. The sensor for $\alpha_y$ is illustrated in FIGS. 14a and 14b and comprises a potentiometer 91 which is affixed to the pivotal bar 32, with the wiper 93 thereof connected to the tow bar 24 so as to provide an electrical response which is proportional to articulation of the trailer. The same type of sensor is used to sense $\alpha_{ws}$, as illustrated in FIG. 14c, and comprises the potentiometer 91′ attached to the axle 52, with the wiper 93′ thereof connected to the steering knuckle 56 so as to provide an electrical response proportional to the various angles of the wheel relative the axle.

The controller is any well known programmable microprocessor, analog control or the like capable of processing the various signals for implementation of the embodiments described above.

Thus, all of the hydraulic and electrical parts used in implementing the invention ar standard off-the-shelf items familiar to the skilled artisan. Some of the mechanical parts have been constructed or modified particularly for ease of implementing the invention. For instance, adaptation of the invention to a towing vehicle requires only the removal of the ball 12 from the draw bar 10 of the standard hitch package long enough to insert yoke 14 therebetween. No further modification of or contact with the towing vehicle is required.

The following claims are intended to cover all of the generic and specific features of the invention herein described and all statements of the scope of the invention which as a matter of language, might be said to fall therebetween.

Now that the invention has been described, we claim:

1. A method of steering the wheels of a two wheel trailer, and comprising the steps of:
    monitoring an angle of articulation in magnitude and sense between said trailer and a towing vehicle and generating articulation angle signals in response thereto;
    monitoring an angle of wheel steering in magnitude and sense relative to an axle of said trailer and generating wheel steering angle signals in response thereto;

computing values of said articulation angle as a percentage of a range of articulation to either side of 0°, in response to said articulation angle signals;

computing values of said wheel steering angle as a percentage of a range of steering to either side of 0° in response to said wheel steering angle signals;

comparing said articulation percentage values with said wheel steering percentage values and generating a correction signal whenever said articulation and steering percentage values are not of equal magnitude; and turning said wheels in response to said correction signal to adjust said wheel steering angle, whenever said articulation percentage value and said wheel steering percentage value are not equal in magnitude, in order to make said percentage values equal.

2. The method as in claim 1, and further comprising the steps of:

sensing transitions between forward and reverse modes of travel of said trailer and generating transition signals in response thereto; and for each of said transitions, changing said wheel steering angle, in response to said transition signals, from a pretransition angle other than 0° to a post-transition angle which is equal to said pretransition angle in magnitude and opposite to said pretransition angle in sense.

3. A method of steering the wheels of a two wheel trailer, and comprising the steps of:

detecting an articulation angle between said trailer and a towing vehicle;

steering said wheels by changing a wheel steering angle automatically according to changes in said articulation angle;

identifying forward and rearward directions of travel of said trailer;

providing a fluid circuit having a motive fluid for effecting said steering in response to said detecting and for interconnecting said angle detecting and said steering via said circuit;

providing a valve for controlling a direction of flow of said motive fluid; and controlling routing of said motive fluid through said circuit via said directional control valve and automatically according to each of said directions of travel so as to provide a particular sense of said wheel steering angle according to said direction of travel.

4. A method as in claim 3, and further comprising the steps of:

providing that said wheel steering angle has the same sense as said articulation angle when said direction of travel is forward and is opposite in sense when said direction of travel is rearward.

5. A method as in claim 3, and further comprising the steps of:

providing that a ratio of wheel steering angle to articulation angle is greater in magnitude for said rearward travel than for said forward travel.

6. A method as in claim 3, and further comprising the steps of:

detecting speeds of travel of said trailer;

setting a high set point speed of travel; and altering routing of said fluid via said valve when said direction of travel is forward and said high set point is detected so as to retain said wheels in a neutral mode of straight-away orientation at speeds above said high set point.

7. A method as in claim 6, and further comprising the steps of:

setting a low set point speed of travel; and realtering routing of said fluid via said valve when said speed decreases and said low set point is detected so as to release said wheels from retention in said neutral mode at speeds below said low set point.

8. A method as in claim 7, and further comprising the steps of:

providing that said high and low set points are set to speeds which are sufficiently different as to avoid constant cycling in and out of said neutral mode during a generally constant speed of travel of the trailer near either of said set points.

9. An apparatus for steering the wheels of a two wheel trailer, and comprising:

means for monitoring an angle of articulation in magnitude and sense between said trailer and a towing vehicle and generating articulation angle signals in response thereto;

means for monitoring an angle of wheel steering in magnitude and sense relative to an axle of said trailer and generating wheel steering angle signals in response thereto;

means for receiving said articulation angle signals and computing values of said articulation angle as a percentage of a range of articulation to either side of 0°;

means for receiving said wheel steering angle signals and computing values of said wheel steering angle as a percentage of a range of steering to either side of 0°;

means for comparing said articulation percentage values with said wheel steering percentage values and generating a correction signal whenever said articulation and wheel steering percentage values are not of equal magnitude; and means, responsive to said correction signal, for turning said wheels to adjust said wheel steering angle, whenever said articulation percentage value and said wheel steering percentage value are not equal in magnitude, in order to make said percentage values equal.

10. An apparatus as in claim 9, and further comprising:

means for sensing transitions between forward and reverse modes of travel of said trailer;

means for generating transition signals in response to said sensing; and for each of said transitions, means for changing said wheel steering angle, in response to said transition signals, from a pretransition angle other than 0° to a post-transition angle which is equal to said pretransition angle in magnitude and opposite to said pretransition angle in sense.

11. An apparatus for steering the wheels of a two wheel trailer, and comprising:

means for detecting an articulation angle between said trailer and a towing vehicle;

means for steering said wheels by changing a wheel steering angle automatically according to changes in said articulation angle;

means for identifying forward and rearward directions of travel of said trailer;

a fluid circuit having a motive fluid for effecting said steering in response to said detecting and for interconnecting said angle detecting and said steering via said circuit;

valve means for controlling a direction of flow of said motive fluid; and means for controlling routing of said motive fluid through said circuit via said valve means and automatically according to each of said directions of travel so as to provide a particular sense of said wheel steering angle according to said direction of travel.

12. An apparatus as in claim 11, and further comprising:

means for providing that said wheel steering angle has the same sense as said articulation angle when said direction of travel is forward and is opposite in sense when said direction of travel is rearward.

13. An apparatus as in claim 11, and further comprising:

means for providing that a ratio of wheel steering angle to articulation angle is greater in magnitude for said rearward travel than for said forward travel.

14. An apparatus as in claim 11, and further comprising:

means for detecting speeds of travel of said trailer;

means for setting a high set point speed of travel; and means for altering routing of said fluid via said valve means when said direction of travel is forward and said high set point is detected so as to retain said wheels in a neutral mode of straight-away orientation at speeds above said high set point.

15. An apparatus as in claim 14, and further comprising:

means for setting a low set point speed of travel; and means for realtering routing of said fluid via said valve means when said speed decreases and said low set point is detected so as to release said wheels from retention in said neutral mode at speeds below said low set point.

16. An apparatus as in claim 15, and further comprising:

means for setting said high and low set points to speeds which are sufficiently different as to avoid constant cycling in and out of said neutral mode during a generally constant speed of travel of the trailer near either of said set points.

17. An apparatus for steering the wheels of a two wheel trailer and comprising:

means for attaching said trailer to a towing vehicle such that said trailer is pivotal above yaw, pitch, and roll axes; and means for converting movement of said trailer about said yaw axis into a motive force for said steering, said motive force being transmitted via a fluid; and means for controlling said steering in response to and according to forward and reverse directions for travel of said trailer in order to accomplish said steering in forward and reverse directions of travel.

18. An apparatus as in claim 17, wherein said attaching means comprises:

a generally standard draw bar and hitch ball on said towing vehicle having a nonpivotal yoke attached laterally and perpendicularly to said draw bar, said yoke having pins situated on each side of said ball and on said pitch axis which passes through a center of said ball;

a tow bar attached at one end thereof to said trailer such that said trailer is rotatable about a longitudinal axis of said tow bar, said tow bar having a generally standard socket and latch at said other end for connection of said trailer to said hitch ball of said towing vehicle such that said longitudinal axis is coincident with said roll axis which passes through said center of said ball and said trailer is pivotal about said roll axis relative to said tow bar; and a first bar affixed to said tow bar near said one end and extending laterally of said tow bar, and a second bar attached to said socket and being pivotal about said yaw axis which passes through said center of said ball, said second bar having means engagable with said pins of said yoke such that said second bar pivots about said yaw axis in concert with said yoke and about said pitch axis relative to said yoke.

19. An apparatus as in claim 18, wherein said converting means comprises:

actuator means attached to and extending between corresponding ends of said first and second bars and being pivotal relative to said second bar;

steering means operatively attached to said wheels and interactive with said actuator means such that pivoting of said second bar is transferred to said wheels via said steering means.

20. An apparatus as in claim 19, and further comprising:

a hydraulic circuit interconnecting said actuator means and said steering means, wherein said actuator means comprises hydraulic cylinders which expand and contract according to articulation of said trailer about said yaw axis and displace fluid of said hydraulic circuit to and from an hydraulic cylinder as part of said steering means.

21. An apparatus as in claim 17, wherein said controlling means comprises:

flow control valve means for routing flow of said fluid according to said forward and reverse directions for travel of said trailer; and means for detecting and differentiating between forward and reverse directions of travel for said trailer and controlling said flow control valve means accordingly.

* * * * *